United States Patent
Kim et al.

(10) Patent No.: US 9,490,939 B2
(45) Date of Patent: Nov. 8, 2016

(54) APPARATUS AND METHOD FOR CALCULATING TRANSMISSION CONTROL PROTOCOL CHECKSUM

(71) Applicant: Electronics and Telecommunications Research Institute, Daejeon (KR)

(72) Inventors: Ik-Soon Kim, Daejeon (KR); Sun-Ja Kim, Daejeon (KR); Chae-Kyu Kim, Daejeon (KR); Jong-Hyun Park, Daejeon (KR)

(73) Assignee: ELECTRONICS AND TELECOMMUNICATIONS RESEARCH INSTIT, Daejeon (KR)

( * ) Notice: Subject to any disclaimer, the term of this patent is extended or adjusted under 35 U.S.C. 154(b) by 218 days.

(21) Appl. No.: 14/508,094

(22) Filed: Oct. 7, 2014

(65) Prior Publication Data

US 2015/0100861 A1    Apr. 9, 2015

(30) Foreign Application Priority Data

Oct. 7, 2013  (KR) .................. 10-2013-0119259
Jul. 21, 2014  (KR) .................. 10-2014-0091812

(51) Int. Cl.
  *G06F 11/00*  (2006.01)
  *H04L 1/00*   (2006.01)
  *H04L 29/06*  (2006.01)

(52) U.S. Cl.
  CPC ............ *H04L 1/0061* (2013.01); *H04L 1/0041* (2013.01); *H04L 69/163* (2013.01); *H04L 69/166* (2013.01)

(58) Field of Classification Search
  CPC ... H04L 69/161; H04L 69/163; H04L 69/12; H04L 69/16

USPC .......................................... 714/801
See application file for complete search history.

(56) References Cited

U.S. PATENT DOCUMENTS

| | | | | |
|---|---|---|---|---|
| 7,283,528 | B1 * | 10/2007 | Lim | H04L 1/0072 370/392 |
| 7,386,627 | B1 * | 6/2008 | Lango | H04L 65/605 709/231 |
| 7,660,264 | B1 * | 2/2010 | Eiriksson | H04L 12/4633 370/254 |
| 2001/0036196 | A1 * | 11/2001 | Blightman | H04L 1/0061 370/465 |
| 2005/0076287 | A1 | 4/2005 | Mantong | |
| 2007/0162820 | A1 | 7/2007 | Choi | |
| 2008/0117911 | A1 | 5/2008 | Rajakarunanayake et al. | |

FOREIGN PATENT DOCUMENTS

KR  1020050060298 A  6/2005
KR  1020060008587 B1  1/2006

* cited by examiner

*Primary Examiner* — David Ton
(74) *Attorney, Agent, or Firm* — William Park & Associates Ltd.

(57) ABSTRACT

Disclosed herein is an apparatus and method for calculating a TCP checksum. An apparatus for calculating a TCP checksum includes a data division unit for dividing content to be transmitted into two or more primary data fragments by a unit of a preset byte. A first checksum calculation unit calculates first checksums for the primary data fragments, respectively. A second checksum calculation unit calculates a second checksum for secondary data to be inserted into a data area of the TCP segment using the first checksums. Accordingly, in TCP-based networks, a checksum calculation procedure is improved upon transmitting static content, so that a static content transfer rate occupying most of TCP-based network traffic can be improved.

20 Claims, 6 Drawing Sheets

APPARATUS AND METHOD FOR CALCULATING TRANSMISSION CONTROL PROTOCOL CHECKSUM

CROSS REFERENCE TO RELATED APPLICATIONS

This application claims the benefit of Korean Patent Application Nos. 10-2013-0119259, filed Oct. 7, 2013 and 10-2014-0091812, filed Jul. 21, 2014, which are hereby incorporated by reference in their entirety into this application.

BACKGROUND OF THE INVENTION

1. Technical Field

The present invention relates generally to an apparatus and method for calculating a Transmission Control Protocol (TCP) checksum and, more particularly, to technology that can improve a procedure for calculating a checksum of a TCP segment, which is required to efficiently transmit static content in a TCP-based communication network, without requiring exclusive hardware.

2. Description of the Related Art

Computer networks including the Internet occupy such a large part of modern information and communication society that it is impossible to imagine society without computer networks. Recently, the amount of data, such as that of social network service (SNS), stock trading markets, and web pages, has explosively increased. In order to process such increased data, a neologism "big data" has appeared, and research into a series of methods for storing, treating, processing, and training a large amount of data with the appearance of "big data" has been conducted.

Among computer network protocols, Transmission Control Protocol/Internet Protocol (TCP/IP) has become the basis of a large number of protocols including a Hypertext Transfer Protocol (HTTP) web protocol, a File Transfer Protocol (FTP), a Simple Mail Transfer Protocol (SMTP), etc., and thus it is very important to improve a TCP/IP communication protocol transmission procedure. However, the transmission of data using the TCP/IP communication protocol includes a large number of calculation procedures. First, in case of wired internet frame-based transmission for Ethernet transmission is required and in case of wireless internet corresponding physical and data link layer transmissions are required, and the fragmentation of an IP packet into a header and data to be transmitted is required for IP transmission. Further, the configuration of a header and data to be transmitted for a TCP segment is required for TCP transmission. Furthermore, in TCP, 16-bit checksum calculation must be performed on a TCP header and data to be transmitted for each of all TCP segments to be transmitted, and such calculation may be a burden on a Central Processing Unit (CPU) and may influence a transfer rate.

As such, exclusive hardware for exclusively performing a TCP/IP transmission procedure was developed, and then a TCP Offload Engine (TOE), intending to reduce a burden on the CPU in a TCP/IP transmission procedure, was developed and is currently used. Such a TOE supports all of TCP/IP protocol stacks or performs functions of a part of the stacks, such as calculating checksums, using exclusive hardware. A network driver transmits desired data to a Network Interface Card (NIC) using a Direct Memory Access (DMA) function, and the NIC configures TCP/IP segments/packets from the received data using exclusive hardware and transfers the TCP/IP segments/packets. A procedure for receiving data from other computers is similar to this procedure.

However, such a hardware-based TOE is not always adopted. The reason for this is that an NIC equipped with a TOE function has the disadvantage of being expensive, and a Linux kernel does not support TOE hardware. Further, TOE hardware has security vulnerabilities, and is problematic in that the buffering of data becomes more and more serious due to the restriction in the processing ability of a TOE chip. Furthermore, there are problems in that a TOE causes many changes in a Linux kernel, TOE hardware is not standardized, and the lifespan of a TOE NIC becomes short due to rapid improvements in the performance of system hardware. In relation to this, Korean Patent Application Publication No. 10-2005-0060298 discloses a checksum generation apparatus and method.

SUMMARY OF THE INVENTION

Accordingly, the present invention has been made keeping in mind the above problems occurring in the prior art, and an object of the present invention is to provide an apparatus and method for calculating a checksum, which can simplify a TCP checksum calculation procedure occurring in a TCP segmentation process, without requiring separate TOE exclusive hardware, in order to reduce a burden on a CPU that may occur in a TCP/IP transmission procedure for transmitting static content.

In accordance with an aspect of the present invention to accomplish the above object, there is provided an apparatus for calculating a checksum of a Transmission Control Protocol (TCP) segment, including a data division unit for dividing content to be transmitted into two or more primary data fragments by a unit of a preset byte, a first checksum calculation unit for calculating first checksums for the primary data fragments, respectively, and a second checksum calculation unit for calculating a second checksum for secondary data to be inserted into a data area of the TCP segment using the first checksums.

The unit size of the preset byte must be even-numbered bytes.

The first checksum calculation unit may perform a 16-bit one's complement addition on each of the primary data fragments.

The first checksum calculation unit may be configured to calculate a first checksum for an i-th primary data fragment by performing a one's complement addition on results of performing the one's complement addition on first to $i(i \geq 1)$-th primary data fragments.

The first checksum calculation unit may be configured to, if the last data fragment is not aligned to 16 bits, pad the last data fragment with 0, and perform the one's complement addition using results of padding.

The apparatus may further include a first checksum management unit for, if the first checksums have been calculated for the respective primary data fragments, inserting the first checksums into ends of corresponding primary data fragments, respectively.

The second checksum calculation unit may be configured to, when the secondary data is partial primary data ranging from $j(j \geq 1)$-th to $k(k \geq j)$-th primary data fragments, calculate a second checksum by performing a 16-bit one's complement subtraction on a first checksum of the k-th primary data fragment and a first checksum of the $(j-1)$-th primary data fragment.

In accordance with another aspect of the present invention to accomplish the above object, there is provided a method of calculating a checksum of a Transmission Control Protocol (TCP) segment, including dividing content to be transmitted into two or more primary data fragments by a unit of a preset byte, calculating first checksums for the primary data fragments, respectively, and calculating a second checksum for secondary data to be inserted into a data area of the TCP segment using the first checksums.

The unit size of the preset byte must even-numbered bytes.

Calculating the first checksums may include performing a 16-bit one's complement addition on each of the primary data fragments.

Calculating the first checksums may further include calculating a first checksum for an i-th primary data fragment by performing a one's complement addition on results of performing the one's complement addition on first to i($i \geq 1$)-th primary data fragments.

Calculating the first checksums may further include, if the last data fragments obtained from division are not aligned to 16 bits, aligning the last data fragments to 16 bits by padding the primary data fragments with 0.

The method may further include, if the first checksums have been calculated for the respective primary data fragments, inserting the first checksums into ends of corresponding primary data fragments, respectively.

Calculating the second checksum may include, when the secondary data is partial primary data ranging from j($j \geq 1$)-th to k($k \geq j$)-th primary data fragments, calculating a second checksum by performing a 16-bit one's complement subtraction on a first checksum of the k-th primary data fragment and a first checksum of the (j–1)-th primary data fragment.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
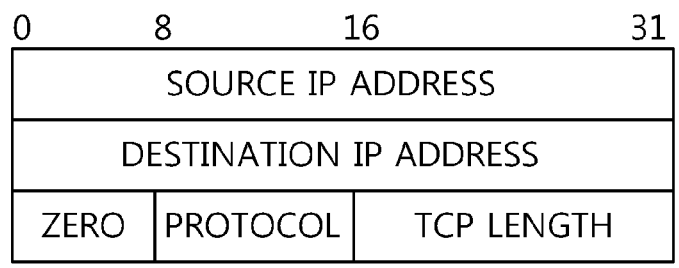
FIG. 1 is a diagram showing an example of a typical pseudo IP header in IPv4.

Details of other embodiments of the present invention are included in detailed descriptions and attached drawings. The advantages and features of described technology and methods for achieving the technology will be more clearly understood from the following embodiments which will be described in detail later in conjunction with the accompanying drawings. It should be noted that the same reference numerals are used to designate the same or similar elements throughout the drawings.

Hereinafter, embodiments of an apparatus and method for calculating a TCP checksum will be described in detail with reference to the attached drawings.

Figure 2:
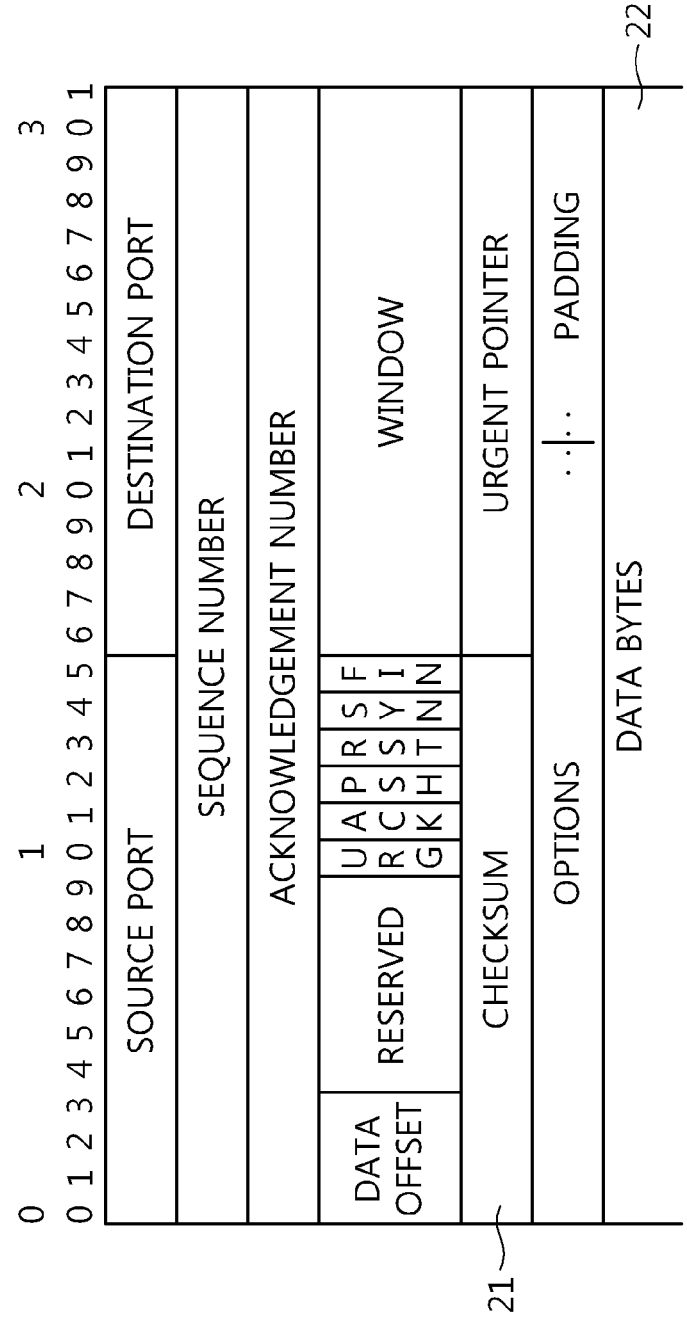
FIG. 2 is a diagram showing an example of a typical TCP segment format.

FIG. 1 is a diagram showing an example of a typical pseudo IP header in IPv4. FIG. 2 is a diagram showing an example of a typical TCP segment format.

A procedure in which a transmitter calculates a checksum of a TCP segment will be described in detail with reference to FIGS. 1 and 2.

First, in case of IPv4, a pseudo IP header shown in FIG. 1 is added to a TCP segment.

Then, a checksum field 21 is filled with 0.

Next, if the total number of bytes of data for which a checksum is to be calculated is not an even number, a 1-byte padding in which all bits are 0 is added to the data. In this case, the padding is used only to calculate a checksum, and is discarded after the calculation of the checksum has been completed.

Then, all values of the TCP segment are added to each other using a 16-bit one's complement addition to calculate a checksum. In this case, the TCP segment may chiefly include a pseudo IP header area, a TCP header and option area, and a data area 22.

Then, complements of results obtained by adding all values of the TCP segment are obtained using a method for changing 0s to 1s or changing is to 0s, and then the finally obtained resulting values are inserted into the checksum field 21.

Thereafter, the pseudo IP header and the added padding are removed, and the TCP segment is transferred to an IP module for encapsulation.

In accordance with an embodiment, the TCP checksum calculation apparatus and method relate to technology for improving a TCP checksum calculation procedure, which occurs in a TCP segment transmission process when a server computer desires to transmit static content using a TCP protocol, without requiring separate exclusive hardware. In particular, in the above-described procedure for calculating the checksum of the TCP segment, the 'procedure for calculating a checksum by adding all values of the TCP segment using a 16-bit one's complement addition' may be bettered. More specifically, in the process for calculating a TCP checksum, a procedure for calculating a checksum for a data area is innovatively improved, thus resulting in the enhancement of TCP performance of a transmitter-side computer.

Although not shown in FIGS. 1 and 2, the TCP checksum calculation apparatus and method according to the present invention may be identically applied even to a case where a checksum of a User Datagram Protocol (UDP) is calculated.

Figure 3:
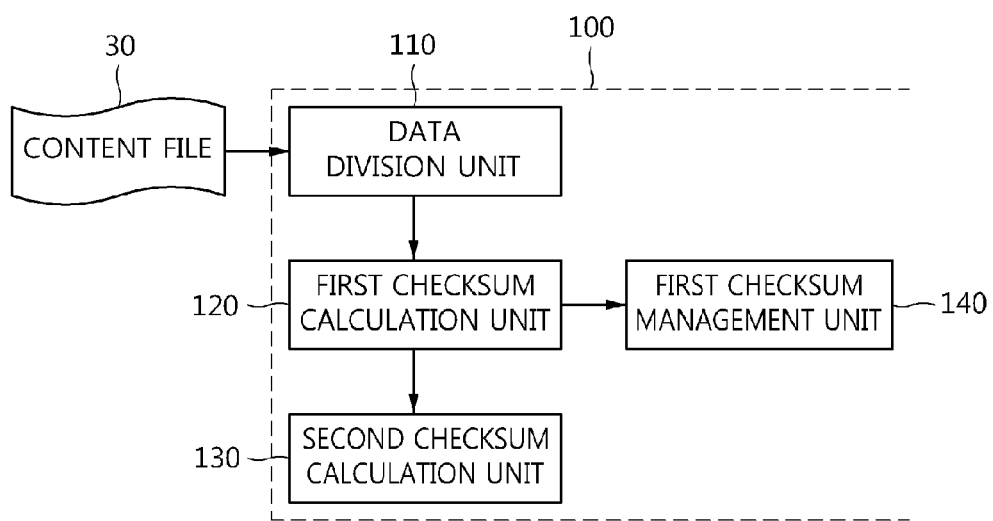
FIG. 3 is a block diagram showing an apparatus for calculating a TCP checksum according to an embodiment.
Figure 4:
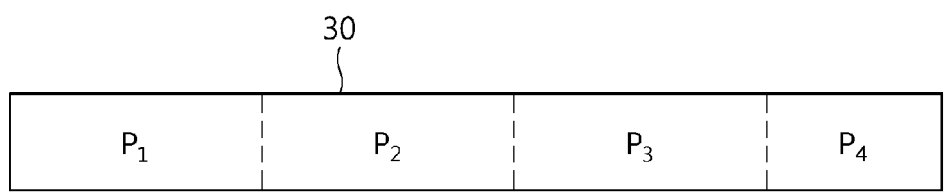
FIGS. 4 and 5 are diagrams showing a procedure in which the TCP checksum calculation apparatus calculates a checksum according to an embodiment.
Figure 5:
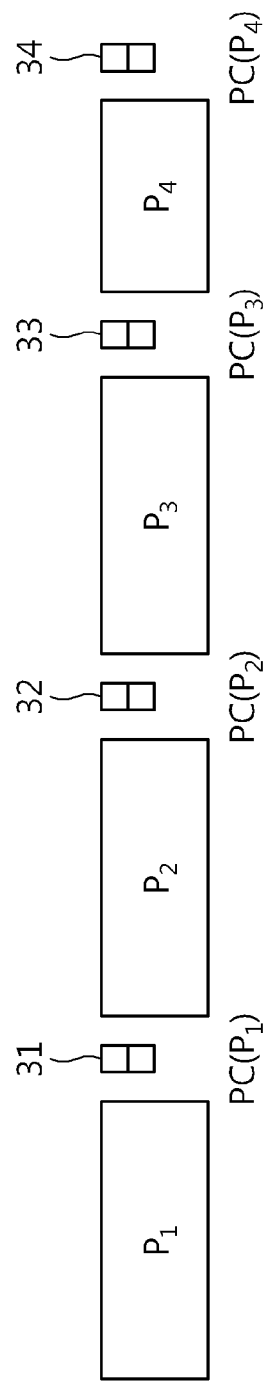

FIG. 3 is a block diagram showing an apparatus for calculating a TCP checksum according to an embodiment. FIGS. 4 and 5 are diagrams showing a procedure in which the TCP checksum calculation apparatus calculates a checksum according to an embodiment.

Referring to FIG. 3, an apparatus 100 for calculating a TCP checksum according to an embodiment may include a data division unit 110, a first checksum calculation unit 120, a second checksum calculation unit 130, and a first checksum management unit 140.

The data division unit 110 may divide a static content file to transmit into two or more primary data fragments by the unit of preset bytes. In this case, the preset bytes must be even-numbered.

FIG. 4 illustrates an example in which static content (content file) 30 to be transmitted is divided into four primary data fragments $P_1$, $P_2$, $P_3$, and $P_4$, wherein the number of primary data fragments obtained from division may be determined depending on the total byte size of the static content and the unit of a preset byte.

The first checksum calculation unit 120 calculates first checksums for the primary data fragments $P_1$, $P_2$, $P_3$, and $P_4$, respectively.

For example, the first checksum calculation unit 120 may calculate the first checksums for the respective primary data fragments $P_1$, $P_2$, $P_3$, and $P_4$ using the following Equation (1):

$$PC(P_0)=0$$

$$PC(P_i)=S(P_1)\oplus \ldots \oplus S(P_i)(i\geq 1) \quad (1)$$

where operation $\oplus$ denotes a 16-bit one's complement addition. Further, $PC(P_i)$ denotes a first checksum for an i-th primary data fragment, and $S(P_i)$ denotes the result of performing the 16-bit one's complement addition on the i-th primary data fragment.

When a description is made with reference to FIG. 4 as an example, the first checksum calculation unit 120 may calculate $S(P_1)$, $S(P_2)$, $S(P_3)$ and $S(P_4)$ by performing a 16-bit one's complement addition on each of the primary data fragments $P_1$, $P_2$, $P_3$, and $P_4$.

Thereafter, by applying the calculated $S(P_1)$, $S(P_2)$, $S(P_3)$ and $S(P_4)$ to Equation (1), first checksums for respective primary data fragments $P_1$, $P_2$, $P_3$, and $P_4$ may be calculated using the following Equation (2):

$$PC(P_0)=0$$

$$PC(P_1)=S(P_1)$$

$$PC(P_2)=S(P_1)\oplus S(P_2)$$

$$PC(P_3)=S(P_1)\oplus S(P_2)\oplus S(P_3)$$

$$PC(P_4)=S(P_1)\oplus S(P_2)\oplus S(P_3)\oplus S(P_4) \quad (2)$$

Meanwhile, unless the last data fragment is aligned to 16 bits, the first checksum calculation unit 120 will pad the last data fragment with 0 to align the last data fragment to 16 bits, and will perform the one's complement addition using the results of the padding.

If the first checksums have been calculated for the respective primary data fragments, the second checksum calculation unit 130 may calculate a second checksum for secondary data to be transmitted with the secondary data inserted into the data area 22 of the TCP segment of FIG. 3, using the respective calculated first checksums.

For example, if the secondary data to be inserted into the data area 22 of the TCP segment is partial primary data ranging from $j(j\geq 1)$-th to $k(k\geq j)$-th primary data fragments among the primary data fragments obtained from division, the second checksum $TPC(P_{kj})$ may be calculated by performing a 16-bit one's complement subtraction on the first checksum $PC(P_k)$ of the k-th primary data fragment $P_k$ and the first checksum $PC(P_{j-1})$ of the (j−1)-th primary data fragment $P_{j-1}$, using the following Equation (3):

$$TPC(P_{kj})=(P_k)\ominus PC(P_{j-1})=S(P_j)\oplus \ldots \oplus S(P_k) \quad (3)$$

where operation $\ominus$ denotes a 16-bit one's complement subtraction.

That is, when the secondary data ranging from primary data fragments $P_j$ to $P_k$ is intended to be inserted into the data area of the TCP segment, the second checksum for the data area is $S(P_j)\oplus \ldots \oplus S(P_k)$ and may be simply calculated by applying the previously calculated first checksums to $PC(P_k)\ominus PC(P_{j-1})$.

A description is made with reference to FIG. 4 as an example. When secondary data includes a second primary data fragment $P_2$ and a third primary data fragment $P_3$, the second checksum $TPC(P_{32})$ is $PC(P_3)\ominus PC(P_1)$.

Meanwhile, the first checksum management unit 140 manages first checksums for respective primary data fragments calculated by the first checksum calculation unit 120.

In accordance with an example, the first checksum management unit 140 may manage first checksums calculated for respective primary data fragments by inserting the first checksums as 2 bytes into ends of the corresponding primary data fragments. In this case, the first checksum management unit 140 may store the first checksums in the same file as a primary data file. In accordance with another embodiment, the first checksum management unit 140 may collect the calculated first checksums and store and manage them in a separate file.

FIG. 5 illustrates an example in which first checksums are inserted into and managed in original static content. If static content to be transmitted is divided into four primary data fragments $P_1$, $P_2$, $P_3$, and $P_4$, the first checksum management unit 140 allocates 2-byte first checksum management areas 31, 32, 33, and 34 to the respective ends of the primary data fragments $P_1$, $P_2$, $P_3$, and $P_4$. If the first checksums $PC(P_1)$, $PC(P_2)$, $PC(P_3)$, and $PC(P_4)$ of the primary data fragments $P_1$, $P_2$, $P_3$, and $P_4$ are calculated, the first checksum management unit 140 may manage the first checksums by inserting the first checksums into the corresponding first checksum management areas 31, 32, 33, and 34, respectively.

However, a method of managing the calculated first checksums is not limited to the above-described example, and the first checksums may also be managed by various methods depending on the performance or environment of a system performing the method.

Figure 6:
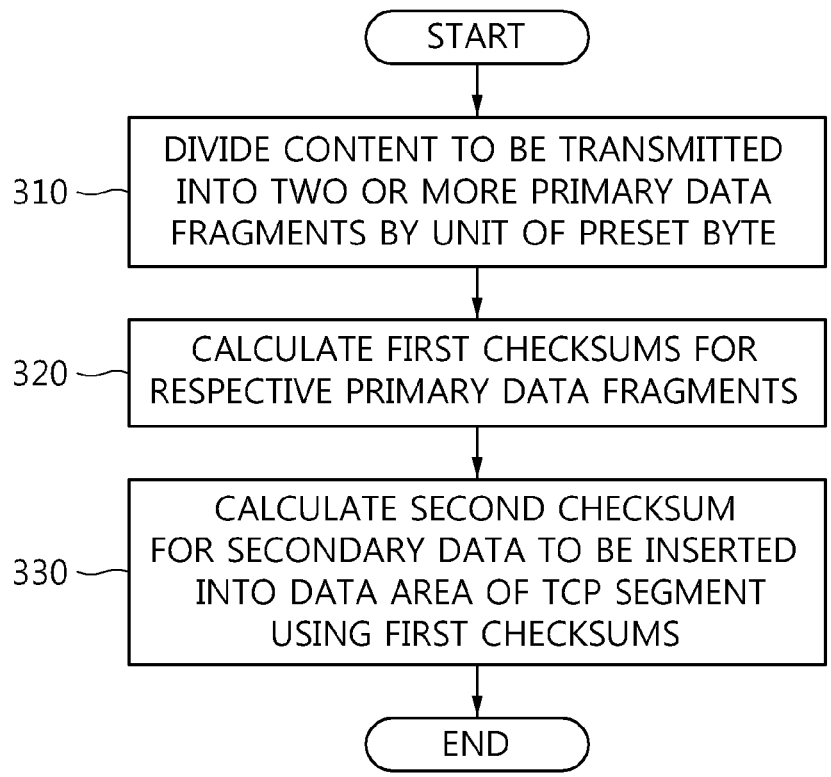
FIG. 6 is a flowchart showing a method for calculating a TCP checksum according to an embodiment.
Figure 7:
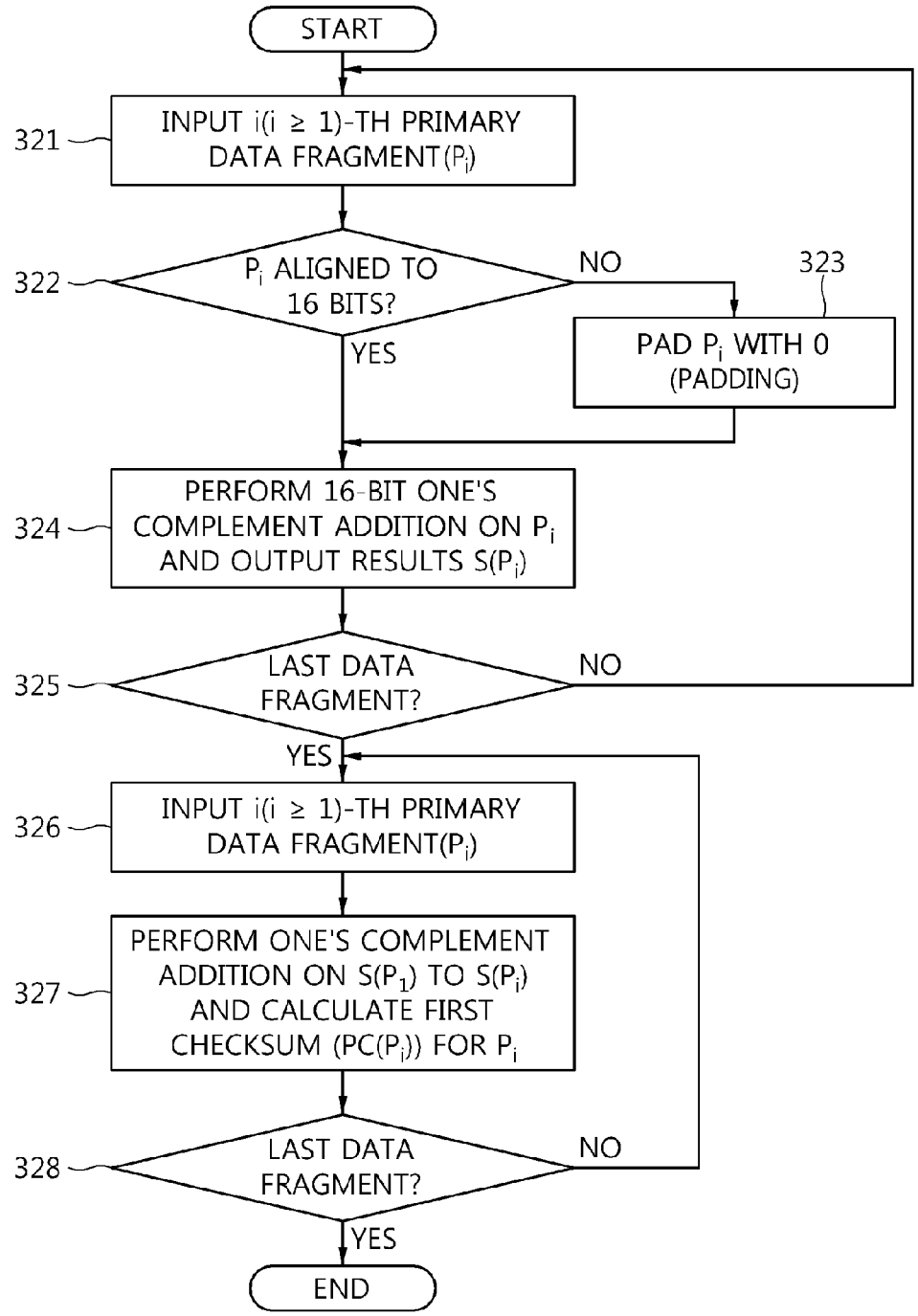
FIG. 7 is a detailed flowchart showing a first checksum calculation step in the TCP checksum calculation method of FIG. 6.

FIG. 6 is a flowchart showing a method for calculating a TCP checksum according to an embodiment. FIG. 7 is a detailed flowchart showing a first checksum calculation step in the TCP checksum calculation method of FIG. 6.

FIGS. 6 and 7 may illustrate embodiments of a checksum calculation method performed by the checksum calculation apparatus 100 according to the embodiment of FIG. 3.

Referring to FIG. 6, the checksum calculation apparatus 100 may divide static content desired to be transmitted into two or more primary data fragments by the unit of preset bytes at step 310. In this case, the preset bytes must be even-numbered.

Although not shown in FIG. 6, the checksum calculation apparatus 100 may not divide the static content in the case in which it is judged that the static content to divide is a minimum size for dividing or less.

Then, first checksums may be calculated for respective primary data fragments obtained from division at step 320. In this case, the first checksums for the respective primary data fragments may be calculated using the above Equation (1).

A description will be made in detail with reference to FIG. 7. First, an i-th primary data fragment $P_i$ is input at step 321. Here, an initial value of i is 1($S(P_0)=0$).

Then, it is determined whether the input primary data fragment $P_i$ is aligned to 16 bits at step 322.

Next, as a result of the determination at step 322, if the input primary data fragment $P_i$ is not aligned to 16 bits, the primary data fragment $P_i$ is padded with 0 at step 323, whereas if the input primary data fragment $P_i$ is aligned to 16 bits, a 16-bit one's complement addition is immediately performed on the primary data fragment $P_i$, and then the results of addition S(P$_i$) may be output at step 324. In the actual case, P$_i$ would be always 16-bit aligned unless P$_i$ is the last data fragment.

Then, it is determined whether the current P$_i$ is a last primary data fragment at step 325. If it is determined that the current P$_i$ is not the last primary data fragment, i is increased by 1, and a procedure starting from the step 321 of inputting a next primary data fragment is performed again.

As a result of determination at step 325, if the current P$_i$ is the last data fragment, the primary data fragment P$_i$ is re-input at step 326. A one's complement addition is re-performed on S(P$_1$) to S(P$_i$), which are calculated at step 324 for the input primary data fragment P$_i$, depending on Equation (1), and thus a first checksum PC(P$_i$) for the i-th primary data fragment P$_i$ may be calculated at step 327. In an initial stage, i is 1 and is then sequentially increased.

Next, it is determined whether current primary data fragment is a last primary data fragment at step 328. If the current primary data fragment is not the last primary data fragment, the process proceeds to step 326, where a procedure for calculating a first checksum for the next primary data fragment is repeated.

Meanwhile, although not shown in the drawing, the checksum calculation method of the present invention may further include, if first checksums have been calculated for the respective primary data fragments at step 320, the step of managing the first checksums.

In this case, the checksum calculation apparatus 100 may manage first checksums calculated for respective primary data fragments in the same data file by inserting the first checksums as 2 bytes into ends of the corresponding primary data fragments, as illustrated in FIG. 5, or may collect the first checksums and store and manage them in a separate file.

Referring back to FIG. 6, if first checksums have been calculated for respective primary data fragments at step 320, a second checksum for secondary data to be transmitted with the secondary data inserted into the data area of the TCP segment may be calculated using the respective calculated first checksums at step 330.

For example, if the secondary data to be inserted into the data area of the TCP segment is partial primary data ranging from j(j≥1)-th to k(k≥j)-th primary data fragments among the primary data fragments obtained from division, a second checksum TPC(P$_{kj}$) may be calculated by performing a 16-bit one's complement subtraction on the first checksum PC(P$_k$) of the k-th primary data fragment P$_k$ and the first checksum PC(P$_{j-1}$) of the (j−1)-th primary data fragment P$_{j-1}$, using the above Equation (3).

In accordance with the disclosed embodiments, although a description has been made based on embodiments of Internet Protocol version 4 (IPv4), the present invention can be easily modified and applied to IPv6. In this way, in accordance with the disclosed embodiments, a TCP checksum calculation procedure occurring in a TCP transmission process is improved, thus greatly reducing a burden on a CPU.

The present invention is advantageous in that, in TCP-based networks such as an HTTP web protocol, an FTP, and an SMTP, a checksum calculation procedure is improved upon transmitting static content, so that a static content transfer rate occupying most of TCP-based network traffic can be improved.

Further, a checksum calculation procedure occurring in a TCP transmission process is improved without requiring separate TOE exclusive hardware, so that operations performed by a CPU are reduced, and thus a burden on the CPU can be remarkably reduced.

Those skilled in the art to which the present invention pertains will appreciate that the present invention can be implemented in other detailed forms without changing the technical spirit or essential features of the present invention. Therefore, the embodiments of the present invention are intended to be illustrative in all aspects, rather than restrictive.

What is claimed is:

1. An apparatus for calculating a checksum of a Transmission Control Protocol (TCP) segment, comprising:
   a data division unit for dividing content to be transmitted into two or more primary data fragments by a unit of even-numbered preset byte;
   a first checksum calculation unit for calculating first checksums for the primary data fragments, respectively; and
   a second checksum calculation unit for calculating a second checksum for secondary data to be inserted into a data area of the TCP segment using the first checksums.

2. The apparatus of claim 1, wherein the unit size of the preset bytes is even-numbered bytes.

3. The apparatus of claim 1, wherein the first checksum calculation unit performs a 16-bit one's complement addition on each of the primary data fragments.

4. The apparatus of claim 3, wherein the first checksum calculation unit is configured to calculate a first checksum for an i-th primary data fragment by performing a one's complement addition on results of performing the one's complement addition on first to i(i≥1)-th primary data fragments.

5. The apparatus of claim 3, wherein the first checksum calculation unit is configured to, if the last data fragment is not aligned to 16 bits, pad the last data fragment with 0, and perform the one's complement addition using results of padding.

6. The apparatus of claim 1, further comprising a first checksum management unit for, if the first checksums have been calculated for the respective primary data fragments, inserting the first checksums into ends of corresponding primary data fragments, respectively.

7. The apparatus of claim 1, wherein the second checksum calculation unit is configured to, when the secondary data is partial primary data ranging from j(j≥1)-th to k(k≥j)-th primary data fragments, calculate a second checksum by performing a 16-bit one's complement subtraction on a first checksum of the k-th primary data fragment and a first checksum of the (j−1)-th primary data fragment.

8. The apparatus of claim 1, wherein the first checksum management unit is configured to collect the calculated first checksums, and store the first checksums in a single file.

9. The apparatus of claim 8, wherein the first checksum management unit is configured to store the first checksums and the primary data fragments in the single file.

10. The apparatus of claim 1, wherein the first checksum management unit is configured to allocate 2-byte first checksum management areas to respective ends of the primary data fragments if the content to be transmitted is divided into primary data fragments, and manage the first checksums by inserting the first checksums into the corresponding first checksum management areas respectively if the first checksums of the primary data fragments are calculated.

11. A method of calculating a checksum of a Transmission Control Protocol (TCP) segment, comprising:
    dividing content to be transmitted into two or more primary data fragments by a unit of a preset byte;

calculating first checksums for the primary data fragments, respectively; and calculating a second checksum for secondary data to be inserted into a data area of the TCP segment using the first checksums.

12. The method of claim 11, wherein the unit size of the preset bytes is even-numbered bytes.

13. The method of claim 11, wherein calculating the first checksums comprises performing a 16-bit one's complement addition on each of the primary data fragments.

14. The method of claim 13, wherein calculating the first checksums further comprises calculating a first checksum for an i-th primary data fragment by performing a one's complement addition on results of performing the one's complement addition on first to $i(i \geq 1)$-th primary data fragments.

15. The method of claim 13, wherein calculating the first checksums further comprises, if the last data fragments obtained from division are not aligned to 16 bits, aligning the last data fragments to 16 bits by padding the last data fragments with 0.

16. The method of claim 11, further comprising, if the first checksums have been calculated for the respective primary data fragments, inserting the first checksums into ends of corresponding primary data fragments, respectively.

17. The method of claim 11, wherein calculating the second checksum comprises, when the secondary data is partial primary data ranging from $j(j \geq 1)$-th to $k(k \geq j)$-th primary data fragments, calculating a second checksum by performing a 16-bit one's complement subtraction on a first checksum of the k-th primary data fragment and a first checksum of the (j−1)-th primary data fragment.

18. The method of claim 11, wherein calculating the first checksums comprises collecting the calculated first checksums, and storing the first checksums in a single file.

19. The method of claim 18, wherein calculating the first checksums further comprises storing the first checksums and the primary data fragments in the single file.

20. The method of claim 11, wherein calculating the first checksums further comprises allocating 2-byte first checksum management areas to respective ends of the primary data fragments if the content to be transmitted is divided into primary data fragments, and managing the first checksums by inserting the first checksums into the corresponding first checksum management areas respectively if the first checksums of the primary data fragments are calculated.

* * * * *